J. R. RICKETTS.
DUST ARRESTER FOR AIR COMPRESSORS.
APPLICATION FILED DEC. 16, 1918.
1,345,405.
Patented July 6, 1920.
2 SHEETS—SHEET 1.
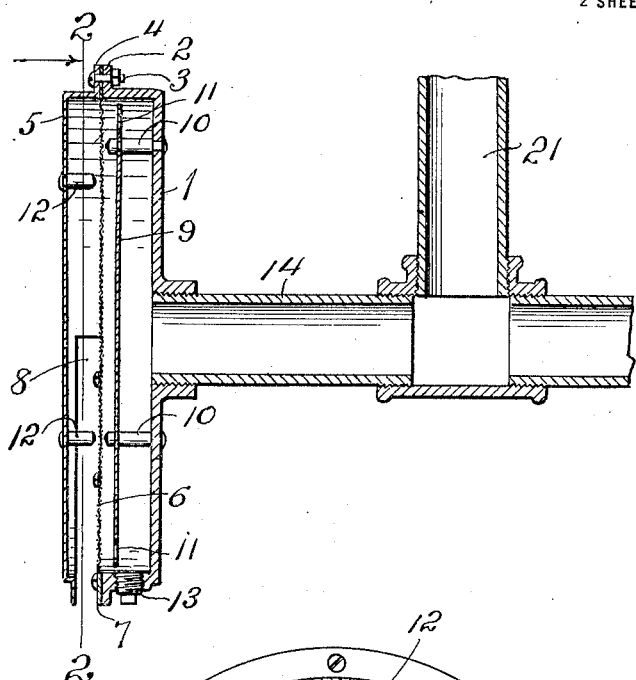
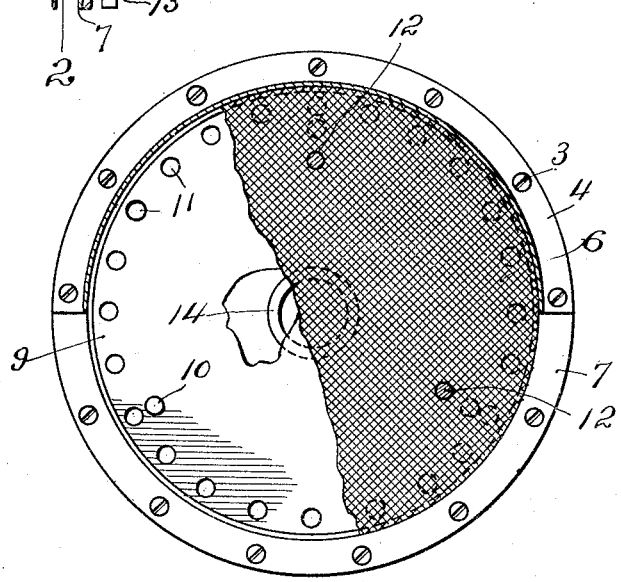
Witness:
R. E. Hamilton
INVENTOR
James R. Ricketts,
BY
Warren D. House,
His ATTORNEY

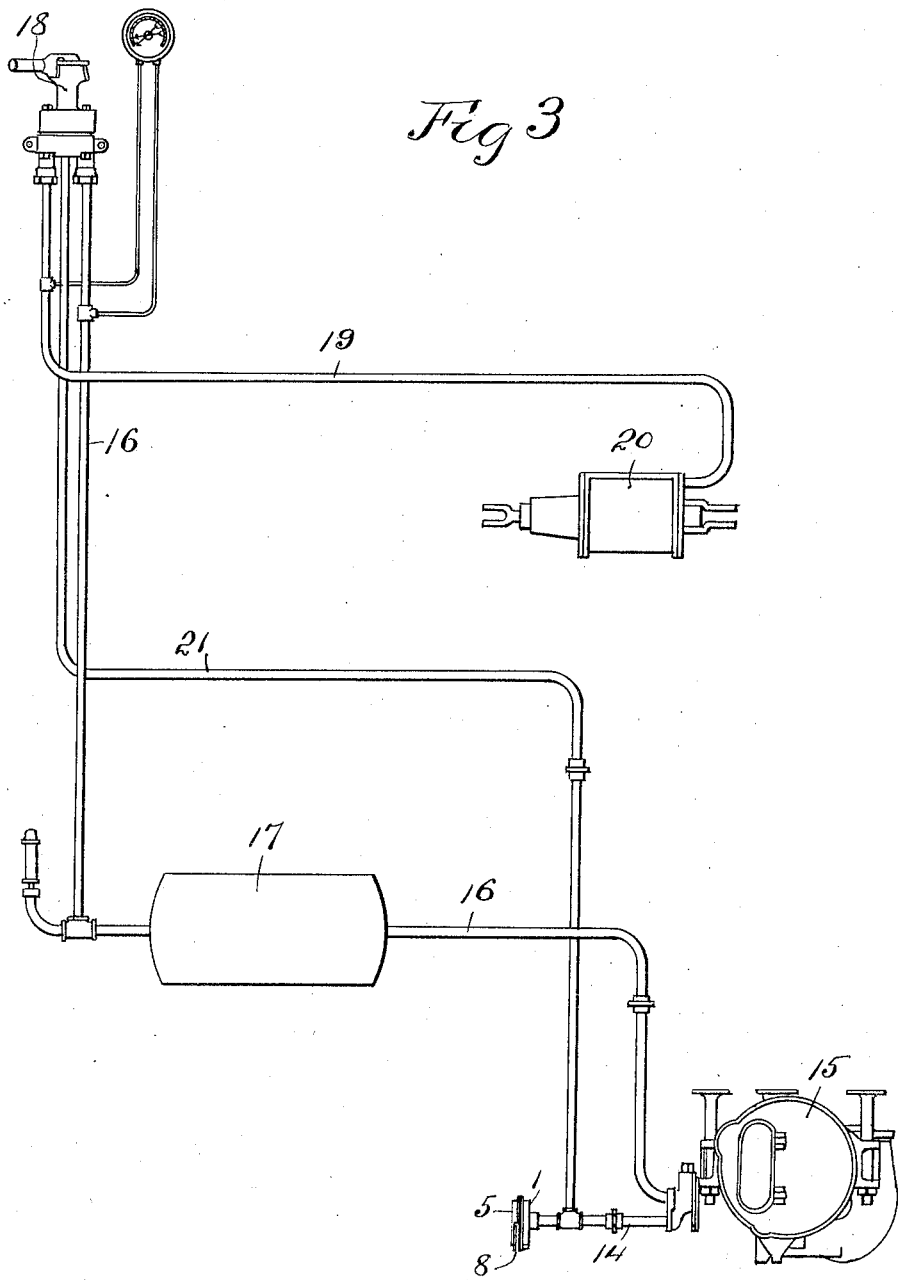

UNITED STATES PATENT OFFICE.

JAMES R. RICKETTS, OF KANSAS CITY, MISSOURI.

DUST-ARRESTER FOR AIR-COMPRESSORS.

1,345,405.  Specification of Letters Patent.  Patented July 6, 1920.

Application filed December 16, 1918. Serial No. 266,877.

*To all whom it may concern:*

Be it known that I, JAMES R. RICKETTS, a citizen of the United States, residing at Kansas City, in the county of Jackson and State of Missouri, have invented a certain new and useful Improvement in Dust-Arresters for Air-Compressors, of which the following is a specification.

My invention relates to improvements in dust arresters. It is particularly well adapted for use in connection with air brake compressors.

The object of my invention is to provide a dust arrester which is simple in construction, cheap to manufacture, durable, not liable to get out of order, which has a maximum of efficiency, and which is self-cleansing.

A further object of my invention is the provision of novel air screening mechanism in which the air supplied to an air compressor passes in one direction through a dust screen and is exhausted through the screen in the opposite direction.

My invention provides still further novel means for jarring from the dust screen the dust accumulating thereon.

My invention provides further novel baffling means by which most of the dust which passes through the screen will be deposited on the bottom of the casing containing the screen.

My invention provides still further a novel screen casing arranged to automatically discharge therefrom dust which collects on and discharged from the outer side of the screen.

My invention provides further supporting means for a baffle member, which also effects the function of striking the dust screen, when the latter vibrates, so as to jar the dust from the screen.

The novel features of my invention are hereinafter fully described and claimed.

In the accompanying drawings which illustrate the preferred embodiment of my invention, Figure 1 is a central longitudinal vertical sectional view of the screen casing, parts contained therein, and a portion of the air conductor connected therewith.

Fig. 2 is a cross section, partly broken away, on the line 2—2 of Fig. 1.

Fig. 3 is a diagrammatic view showing my improved dust arrester employed in an air brake compressor system.

Similar reference characters designate similar parts in the different views.

Referring to Figs. 1 and 2, 1 designates a rear cup-shaped member of a screen casing, the forward edge of which is provided with a peripheral flange 2, to which is releasably attached by means of bolts 3, a peripheral flange 4 of a front cup-shaped member 5, which forms the front of the screen casing.

The dust screen is preferably a screen diaphragm consisting of fine screen wire 6 secured at its periphery to a flat ring 7, which is clamped between the flanges 2 and 4.

The lower half of the front casing member 5 is provided with an opening 8 which permits the dust which collects on the outer side of the screen wire 6 to fall out of the screen casing.

In the member 1 at the rear of the screen wire 6 is provided suitable baffling means designed for the double purpose of protecting the screen wire 6 from being injured by hard particles which may be driven outwardly by the exhaust, and for the purpose of settling such dust as may pass inwardly through the wire 6. Such baffling means comprises, preferably, a vertical baffle plate 9, which extends transversely nearly across the interior of the member 1, and which is supported by pins 10 which are secured to the member 1. The baffle plate 9, near its periphery is provided with transverse holes 11, through which the screened air passes to the rear side of the baffle plate. The baffle plate 9 is located closely adjacent to the screen 6, and the pins 10 are spaced apart at their forward ends from the screen 6 so as to clear the screen, when the latter is not vibrating but are close enough thereto as to strike the rear side of the screen, when the latter is drawn inwardly by suction of the air compressor.

Horizontal pins 12 have their forward ends secured to the member 5 and have their rear ends disposed closely adjacent to but not touching the screen 6, excepting at such times as the latter is forced forwardly by the pressure of exhaust air which passes forwardly through the screen. Thus when the screen 6 vibrates, the pins 10 and 12 alternately strike the screen, thus jarring therefrom the dust accumulating thereon. That portion of the dust which falls from the front of the screen passes out of the casing through the opening or notch 8. That portion of the dust which falls at the rear of the screen is deposited upon the lower inner side of the casing member 1, the bottom of which is provided with a clean-out opening in which is removably fitted a screw plug 13. By removing this screw plug, the dust deposited in the member 1 may be removed.

The member 1 is provided with a central screw-threaded hole, in which is fitted an air conductor 14, which communicates with the intake of an ordinary air brake compressor 15, the one shown in Fig. 3 being of an ordinary type. Connected with the discharge port of the compressor 15 is the usual conductor 16, which includes a storage tank 17 and which is connected to the usual hand operated motorman's valve 18, which is connected in the usual manner by a pipe 19 with the brake cylinder 20, and which is also connected to an exhaust pipe 21, which has it other end connected to the conductor 14 intermediate of the screeen casing member 1 and the air compressor 15.

In the operation of my invention, when the air compressor 15 is operated, air passes into the screen casing through the opening 8, thence through the screen 6, thence to the rear side of the baffle plate 9 through the openings 11, thence through the conductor 14 into the air compressor 15, thence through the conductor 16 to the motorman's valve 18, thence to the brake cylinder 20 and return to the motorman's valve through the pipe 19, thence through the exhaust pipe 21 into the conductor 14. If the compressor 15 is in operation, when the air is exhausted through the exhaust pipe 21, the exhaust air will be drawn into the compressor and then forced into the storage tank 17. If at the time the exhaust takes place, the compressor 15 is not in operation, the exhaust air entering the conductor 14 from the pipe 21 will pass forwardly into the screen casing, thence through the holes 11 of the baffle plate 9, thence forwardly through the screen 6 and thence to the atmosphere through the opening 8.

From the foregoing, it will be understood that when the compressor 15 is operated, air from the atmosphere will pass inwardly through the screen 6 and will deposit most of its dust upon the outer side of the screen. The exhaust air will pass through the screen 6 in the opposite direction, thus forcing outwardly the dust which has collected in the meshes of the screen, such dust being carried out of the casing by the blast of exhaust air through the opening 8. The incoming and outgoing air will vibrate the screen 6, thus causing it to alternately strike the pins 10 and 12, so as to jar from the screen such dust as is not detached therefrom by the air currents.

By having the screen 6 disposed vertically and in position to drop dust falling from it through the opening 8, the forward portion of the screen casing is made self cleaning.

I do not limit my invention to the structure described and shown, as many modifications, within the scope of the appended claims may be made without departing from the spirit of my invention.

What I claim is:—

1. In a dust arrester, a casing having an opening in its lower side communicating with the atmosphere and having a cleanout opening and a removable closure normally closing said cleanout opening, and a vertical screen extending transversely across said casing intermediate of said openings and disposed so that dust dropping from the outer side of the screen will pass through the first named opening.

2. In a dust arrester, a casing having in its lower side an opening communicating with the atmosphere, a vertical baffle plate extending transversely in said casing at the inner side of said opening, and a vertical screen extending across said casing intermediate of said opening and said baffle plate and located so as to drop dust through said opening.

3. In a dust arrester, a casing having two openings, one of which communicates with the atmosphere, a transverse baffling member in said casing intermediate of said openings, a screen diaphragm in said casing intermediate of said baffling member and the opening which communicates with the atmosphere, and means supporting said baffling member and adapted to be struck by said screen diaphragm when the latter vibrates.

4. In a dust arrester, a casing having two openings, one of which communicates with the atmosphere, a transverse baffling member in said casing intermediate of said openings, a screen diaphragm in said casing intermediate of said baffling member and the opening which communicates with the atmosphere, means supporting said baffling member and adapted to be struck by said screen diaphragm when the latter vibrates, and means at the opposite side of said screen diaphragm adapted to be struck by the screen diaphragm when the latter vibrates.

5. In a dust arrester, a casing having two openings, one of which communicates with the atmosphere, and which is located at the bottom of the casing, a transverse baffling member in said casing intermediate of said openings, a vertical screen diaphragm intermediate of the baffling member and the opening which communicates with the atmosphere and disposed so as to drop dust through the last named opening, and means adapted to be struck by the screen diaphragm when the latter vibrates, for jarring dust therefrom.

In testimony whereof I have signed my name to this specification.

JAMES R. RICKETTS.